W. M. MOORE.
SAFETY ATTACHMENT FOR AIR BRAKE SYSTEMS.
APPLICATION FILED MAR. 22, 1919.

1,398,908.

Patented Nov. 29, 1921.
2 SHEETS—SHEET 1.

Witness
H. S. Huggins

Inventor
Walter M. Moore.

By Victor J. Evans
Attorney

W. M. MOORE.
SAFETY ATTACHMENT FOR AIR BRAKE SYSTEMS.
APPLICATION FILED MAR. 22, 1919.

1,398,908.

Patented Nov. 29, 1921.
2 SHEETS—SHEET 2.

UNITED STATES PATENT OFFICE.

WALTER M. MOORE, OF PORTSMOUTH, VIRGINIA.

SAFETY ATTACHMENT FOR AIR-BRAKE SYSTEMS.

1,398,908.  Specification of Letters Patent.  Patented Nov. 29, 1921.

Application filed March 22, 1919. Serial No. 284,511.

*To all whom it may concern:*

Be it known that I, WALTER M. MOORE, a citizen of the United States, residing at Portsmouth, in the county of Norfolk and State of Virginia, have invented new and useful Improvements in Safety Attachments for Air-Brake Systems, of which the following is a specification.

This invention relates to safety attachments for air brake systems and more particularly to automatic air cut-outs.

In all air brake systems of train operation, it is essential to have the air pressure supplied to the brake pipe or train pipe and auxiliaries at its maximum or proper pressure before the train leaves its terminal. When two or more engines are required to haul a train as in double heading, it is desirable that each engine assist in charging up and maintaining maximum pressure in the brake pipe without affecting the application of the brake. It is one object of this invention, therefore, to provide a device that will enable the second or succeeding engine in a train to assist the head engine in charging and maintaining the maximum air pressure in the brake pipe and auxiliaries and to prevent main reservoir pressure from entering the brake pipes after the brakes have been applied through the control of the head engine unless the engineer's valve is operated for this purpose.

Another object of the invention is to provide a valve having means automatically acting under the reduction of pressure in the brake pipe to prevent air from the main reservoir entering the brake pipe, should either of the brake valves upon the engines be moved to running position and will also automatically act upon the increase of pressure in the brake pipe due to movement of the brake valve in either engine to released position, to allow main reservoir pressure to enter the brake pipe.

One practical form of construction and assembly will be described and illustrated in the accompanying drawings, in which:—

Figure 1:
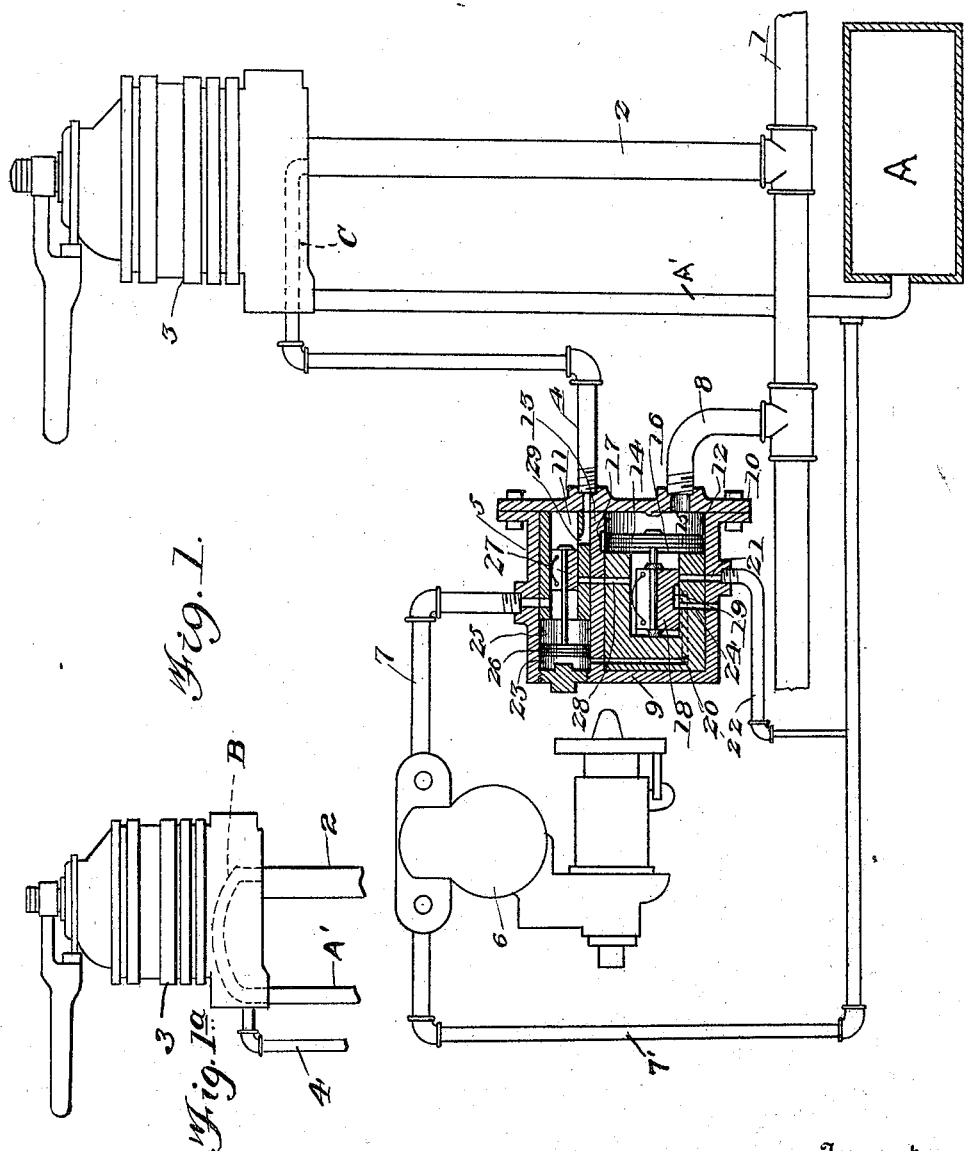

Figure 1 is a diagrammatic view with the attachment valve shown in section and the parts in running position.

Fig. 1ᵃ is a fragmentary view showing the connection to the engineer's valve.

Figure 2:
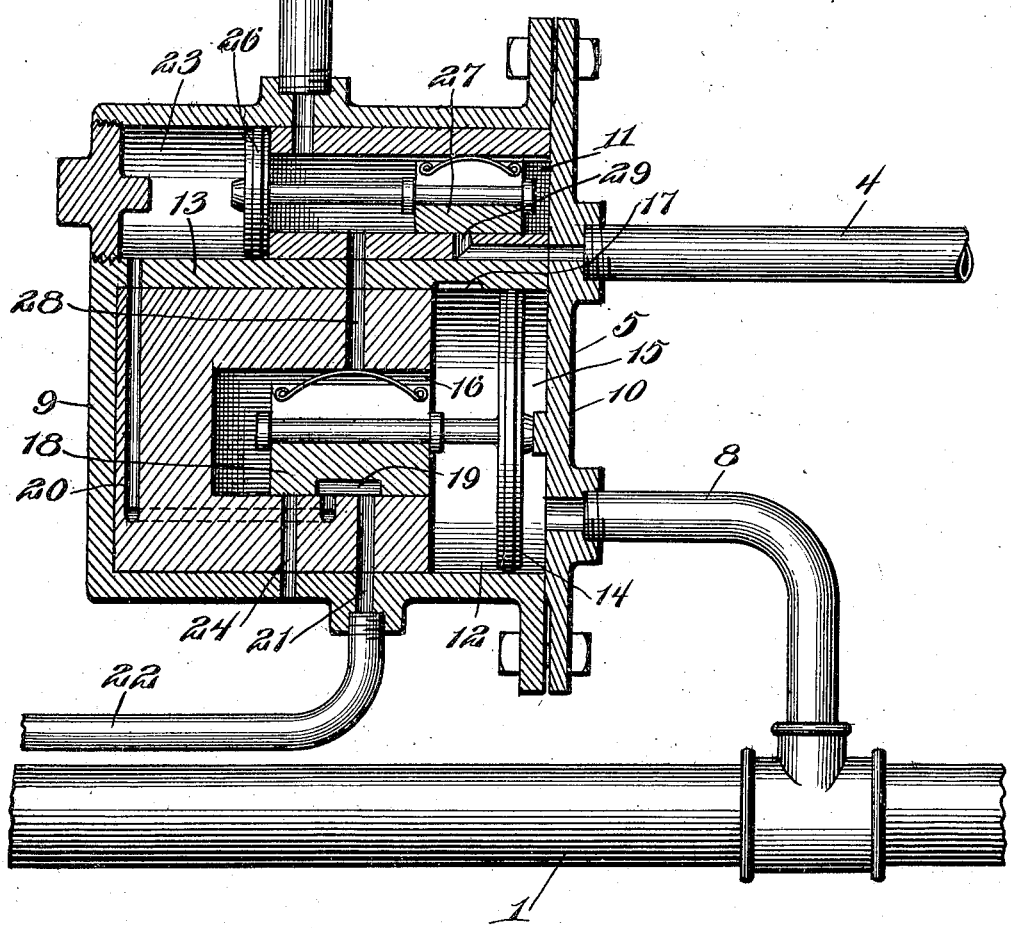

Fig. 2 is a sectional view of the valve with the parts in their other, or operative cut-off position.

In the embodiment illustrated in the drawings, 1 indicates the ordinary train or brake pipe that is connected by the pipe 2 with the engineer's valve 3 of the usual construction. The brake valve shown is the ordinary Westinghouse type known as H—6 and the attachment to be hereinafter described may be included in either the ordinary Westinghouse or New York air brake system.

This engineer's brake valve is designed to have a charging and released position which provides for a large and direct passage for the air from the main reservoir A to the brake pipe. This will permit a rapid flow of main-reservoir air into the brake pipe to charge the train-brake system; to quickly release and recharge the brakes, and to hold the locomotive brakes, if they are applied.

The engineer's brake valve is also connected through the pipe 4 to the attachment which is generally indicated at 5. The ordinary double pressure feed valve 6 which is shown as being of the H—6 type, may be similarly connected through a pipe 7 to the attachment. The feed valve 6 is also connected with the main reservoir A by the pipe 7'.

Another pipe 8 connects the attachment with the brake pipe 1. The safety valve or attachment 5 comprises a casing, 9 having its open end closed by a cap or end plate 10 and is shown as being divided into separate compartments 11 and 12 by means of a partition 13 forming a wall of the casing 5. The compartment 12 has slidably mounted therein a piston 14 that serves to divide said compartment to form the separate chambers 15 and 16. The chamber 15 is in direct communication with the brake pipe through the pipe 8, and the chamber 16 is adapted to communicate with the chamber 15 through a feeding port 17, that may be formed in the partition 13, when the piston 14 is in its left hand position.

The piston 14, as shown, has operatively connected therewith a side valve 18 which has a recess 19 cut in its under side that serves to establish communication through the channel or passage 20 with the port 21 between the main reservoir pipe 22 and the chamber 23 formed in the compartment 11. The recess 19 will connect the channel 20 with the exhaust port 24 when the piston 14 is in the position shown in Fig. 1. The piston 26 divides the left-hand portion of the compartment 11 into the chambers 23 and 25. The piston 26 has connected thereto a sliding valve 27, which slide valve controls the bypass 28 and port 29. The port 29 connects the pipe 4 directly with the compartment 11 through the chamber 25. This chamber 25 is also in direct communication with the pipe 7 so that when the valve 27 is in the position shown in Fig. 1 and the valve lever on the automatic brake valve is in running position, direct communication with the main reservoir and the brake pipe is had over the following circuit; feed or reducing valve 6, pipe 7, chamber 25, port 29, pipe 4, brake valve 3, pipe 2 to the brake pipe 1. When the valve 27 is in the position shown in Fig. 2, as will be hereinafter described, the port 29 is closed by the slide valve 27 and irrespective of the position of the valve lever of the engineer's brake valve, main reservoir pressure cannot be put into the brake pipe 1, until the engineer's brake valve is again moved to release position thereby preventing the engineer of either engine from charging the brake pipe by again moving the brake valve to running position.

In practical operation of the device, when either engineer throws the valve lever of his brake valve to service position, the air pressure is reduced in the brake pipe in the usual manner and the pressure in the chamber 15 is thereby reduced. We will assume for purposes of illustration, that previous to the above mentioned operation the main reservoir pressure is 130 lbs. and that the pressure in pipe 7 after passing through the feed valve 6 is 110 lbs., therefore, the pressure in compartment 11, pipe 4, pipe 2 and the brake pipe 1 will also be 110 lbs.

The compartment 12 is connected directly to the brake pipe through the pipe 8 leading to the chamber 15 that is connected with the chamber 16 by means of the feeding port 17. Thus there will be equalized pressure in the chambers 15 and 16 upon the faces of the piston 14. Upon the reduction of pressure in the chamber 15, due to the movement of the brake valve to service position, or the breaking of an air line as the case may be, the higher pressure then existing in the chamber 16 will tend to move the piston toward the cap or end plate 10 and permit the recess 19 to connect the port 21 with the channel 20. This will allow the main reservoir pressure of 130 lbs. to flow through the port 21, recess 19 and channel 20 into the chamber 23. The piston 14 in moving to the right, as in Fig. 2, closes the feeding port 17 so that the main reservoir pressure enters the chamber 23. The piston 26 will then be forced over a sufficient distance and cause the valve 27 to blank the port 29 and open the bypass 28 leading from the chamber 25 to the chamber 16.

As the chamber 25 is in direct communication with the pipe 7 having 110 lbs. air pressure therein, the piston 14 will be moved toward the cap 10 and held in such position until normal pressure is restored in the brake pipe. It will be seen, however, that when the valve 27 has blanked the port 29, the air supply from the main reservoir to the brake pipe is absolutely cut off until the brake valve is moved to release position. If the engineer returns the valve to running position with the expectation of releasing the brakes there will be insufficient air to return the piston 14 to normal position as shown in Fig. 1. It is, therefore, necessary for him to throw the valve lever of his brake valve to release position so as to connect up the ports of the engineer's valve and permit main reservoir pressure to enter the chamber 15 by way of the brake pipe 1. Thus the piston 14 is restored to its normal position and causes the recess 19 to bridge the port 21 and port 24. The chamber 23 is then opened to the atmosphere and permits the pressure within the chamber 25 to restore the valve 27 to its normal position. Piston 14 will not move over to the left when the brake valve handle is moved to running position after an application of the brakes as said piston will only move to the left when it is acted upon by the main reservoir pressure which will occur when brake valve handle is returned to full releasing position. The port 29 upon being opened, permits the air in the pipe 7 to flow through the chamber 11 and compartment 25, through the port 29 and the pipe 4 to the valve 3 and thence by pipe 2 to the brake pipe 1, thus permitting the engineer of the second engine to assist in restoring normal pressure.

When the rotary valve of the engineer's brake valve 3 is moved to the release and recharging position, main-reservoir pressure has a direct passage into the brake pipe 1 through the pipes $A^1$ and 2 and the usual ports and passages B in the engineer's brake valve, shown diagrammatically in Fig. 1 and the ports and passages connecting the pipe 4 with pipe 2 as shown diagrammatically in Fig. 1$^a$. As the brake pipe pressure increases, the piston 14 moves toward the left as in Fig. 1, moving the slide valve 18, thus closing port 21, through which main reservoir air is admitted. A continued movement will permit the air in chamber 23 to exhaust to the atmosphere through the channel 20 by way of the port 24.

Attention is called to the fact that feed valve pressure is maintained in chamber 16 at all times so that there will not be any reduction of pressure upon the left or inner face of piston 14. This feed valve pressure is maintained in said chamber 16, first through port 17, when piston is in released position, as shown in Fig. 1, and second through port 28 when piston 26 and valve 27 occupy the positions shown in Fig. 2. Piston 14 is moved to the left by excess main reservoir pressure being discharged into the brake valve when returning brake valve handle to full releasing position.

It will thus be seen that I have not only provided a device which prevents the engineer of the second or succeeding engines from negativing the actions of the controlling engineer when the device is used for double heading, but also have provided a device which prevents the engineer from releasing the brakes by throwing his valve lever to running position as when in running position, communication from the main reservoir to the brake pipe is through the feed valve, whereas, in release position, communication is practically direct from the main reservoir to the brake pipe.

What I claim is:—

1. In an air brake system of train control, the combination with a brake pipe, an engineer's brake valve connected therewith, a feed valve and a main reservoir pipe, of an attachment connected to the feed valve, the brake valve, the brake pipe and the main reservoir pipe and comprising a casing, valves operating therein, one of said valves automatically acting upon a reduction in pressure in the brake pipe to cause operation of the other valve by main reservoir pressure to cut off connection between the feed valve and the brake valve.

2. In an air brake system of train control, the combination with a brake pipe, an engineer's brake valve connected therewith, a feed valve and a main reservoir pipe, of an attachment connected to the feed valve, the brake valve, the brake pipe and the main reservoir pipe and comprising a casing, valves operating therein, one of said valves automatically acting upon a reduction in pressure in the brake pipe to cause operation of the other valve by main reservoir pressure to cut off connection between the feed valve and the brake valve, and said valves being returned to normal position upon a restoration of pressure in the brake pipe to restore connection between the brake valve and feed valve.

3. In an air brake system of train control, the combination with a feed valve, a main reservoir pipe, an engineer's brake valve and a brake pipe, of a casing, a pair of compartments therein connected together, pipes connecting one of said compartments with the feed valve and with the engineer's brake valve, a valve in said compartment controlling communication between said pipes, pipes connecting the other compartment with the brake pipe and the main reservoir pipe and a valve in said last mentioned compartment actuated by the air pressure in the brake pipe and controlling the connection between the two compartments and the operation of the first mentioned valve.

4. In an air brake system of train control, the combination with a feed valve, a main reservoir pipe, an engineer's brake valve and a brake pipe connected therewith, of a casing, upper and lower compartments therein, pipes connecting the upper compartment with the feed valve and the brake valve, a channel and a by-pass leading from one compartment to the other, a valve in the upper compartment for controlling the communication between the pipes and by-pass, pipes connecting the lower compartment with the main reservoir pipe and the brake pipe and said lower compartment having an outlet port therein and a valve in said last mentioned compartment actuated by the air pressure for controlling operation of the first mentioned valve and the communication between said channel and port.

5. In an air brake system of train control, the combination with a feed valve, a main reservoir pipe connected therewith, an engineer's brake valve, and a brake pipe connected therewith, of a casing, a partition therein dividing the casing into upper and lower compartments, pipes connecting the upper compartment with said feed valve and brake valve, said casing having a by-pass and a channel connecting one compartment with the other and the lower compartment having an exhaust port, a slide valve in the upper compartment for controlling the communication between the ends of the pipes and the by-pass, a piston connected with said valve, pipes connecting the lower compartment with the main reservoir pipe and the brake pipe, a slide valve in said lower compartment for connecting the channel with the exhaust or with the pipe leading from the main reservoir pipe and a piston connected with said slide valve and acted upon by the compressed air from the brake pipe, said partition having a port therein for permitting said air pressure to act against both faces of the piston when the same is in its inner position.

In testimony whereof I affix my signature.

WALTER M. MOORE.